United States Patent [19]

Tsuji et al.

[11] Patent Number: 5,258,834
[45] Date of Patent: Nov. 2, 1993

[54] ELECTRONIC ENDOSCOPE FOR PRODUCING A COLOR IMAGE BY EXTRACTING A PLURALITY OF FIELD PICTURE IMAGES IN ONE FIELD PERIOD WITHOUT CHANGING A HORIZONTAL CLOCK RATE

[75] Inventors: Kiyoshi Tsuji; Hideaki Ishihara, both of Tokyo, Japan

[73] Assignee: Olympus Optical Co., Ltd., Tokyo, Japan

[21] Appl. No.: 800,951

[22] Filed: Nov. 29, 1991

[30] Foreign Application Priority Data

Feb. 13, 1991 [JP] Japan .................................. 3-20179
Feb. 28, 1991 [JP] Japan .................................. 3-34541

[51] Int. Cl.⁵ ........................... H04N 9/04; H04N 7/18
[52] U.S. Cl. ........................................ 358/98; 358/41; 358/42
[58] Field of Search .................... 358/41, 98, 11, 42, 358/43

[56] References Cited

U.S. PATENT DOCUMENTS 4,851,899  7/1989  Yoshida et al. ................. 358/42
5,006,928  4/1991  Kawajiti et al. ................. 358/98

Primary Examiner—Alvin E. Oberley
Assistant Examiner—Minsun Oh

[57] ABSTRACT

An electronic endoscope system having an electronic endoscope inserted into a body cavity, a light source unit for successively supplying illumination lights into the electronic endoscope, a processor for converting an image pickup signal from the electronic endoscope into an image signal, and a monitor for displaying based on the image signal from the processor. The electronic endoscope is constituted of an inter-line reading type CCD for imaging an object and obtaining an image signal by photoelectric conversion, a drive circuit for driving this CCD, a pre-process circuit for converting the image pickup from the CCD into a video signal, and a pulse transformer for transmitting this video signal to the processor. The processor is constituted of an A/D converter circuit for converting the analog image signal transmitted through the pulse transformer into digital signals, R, G and B FIFO memories for freezing/frame position moving which store the digital signals converted by the A/D converter circuit, D/A converter circuits for D/A conversion of signals from the R, G, and B memories, and post-process circuits for forming video signals from analog signals supplied from the D/A converter circuits.

21 Claims, 18 Drawing Sheets

CCD OUTPUT IN ORDINARY MODE

CCD OUTPUT WHEN TREBLE MODE IS USED

ELECTRONIC ENDOSCOPE FOR PRODUCING A COLOR IMAGE BY EXTRACTING A PLURALITY OF FIELD PICTURE IMAGES IN ONE FIELD PERIOD WITHOUT CHANGING A HORIZONTAL CLOCK RATE

BACKGROUND OF THE INVENTION

This invention relates to an electronic endoscope system having an inter-line-reading type of solid image pickup device which effects photoelectric conversion of a subject image to obtain an image signal.

Recently, electronic endoscopes incorporating at their tips an image sensor such as a CCD from which an endoscope image is output as a TV signal are replacing conventional fiberscopes having an image guide formed of a bundle of optical fibers and a hand operation unit including an ocular portion through which a subject is observed.

For electronic endoscopes, an image sensor having a very small sensing area is required, because it is disposed in an observation head portion in place of the image guide. An R/G/B-surface-sequential image pickup method is known as a method of optimizing color resolution of the total number of image sensor picture elements arranged in the restricted area.

Examples of conventional endoscopes will be described below with reference to FIG. 18 to 24.

As shown in FIG. 18, an electronic endoscope 150 of this kind has an internal filter plate 162 which has color filters having colors R, G, and B and which is disposed on an emergence optical path of a white light source 160. The internal filter plate 162 is rotated to successively irradiate a subject (not shown) with light of these colors through a light guide 156 in the electronic endoscope 150, and image pickup signals obtained from an image sensor 158 with respect to the colors are converted by an A/D converter to extract image signals which are sent to D/A converters 172, 174, and 176 through image memories, R memory 166, G memory 168 and B memory 170, to be combined, thereby obtaining a color image on a color CRT screen (not shown).

For this process, on the TV image output (CRT) side, Fields A and B are interlaced for prevention of flicker. The applicant of the present application has proposed a surface-sequential image output method for a process including this interlacing in Japanese Patent Laid-Open Publication No. 62-82888.

That is, a CCD image sensor of a frame transfer type or a line reading type is used, and image signals 1, 2, 3, ... n are thereby generated with respect to scanning lines are successively stored in frame memories. After groups of information on frame images in colors R, G and B have been stored in the memories, each of them is read every other line with respect to the frames in an alternative field reading manner (signals 1, 3, 5 ... are read in field A and signals 2, 4, 6 ... are read in field B) for interlace scanning. It is thereby possible to obtain an image while reducing the magnitude of flicker.

In this case, however, since one color image is formed from three frame images R, G, and B, flickering and color misalignment take place inevitably due to time differences therebetween.

An apparatus designed to avoid this drawback has been developed which uses an image sensor having a color mosaic filter whose elements are respectively put on pixels on the image sensor sensitive surface to obtain three color signals at a time. Needless to say, in this case, the color resolution and sensitivity are sacrificed in comparison with the former.

A CCD having a mosaic filter (single plate color CCD) will be described below. In the case of a single plate color type, the aperture rate of the sensitive portion is small in comparison with the frame transfer type and the line reading type (each adapted for the black-and-white image pickup and surface-sequential color methods alone), and the exposure time necessary for obtaining one color image is short and the sensitivity is therefore low, as mentioned above. To mitigate these drawbacks, a complementary color filter having cyan, magenta, yellow elements having optical transmissivities higher than those of the R,G, B primary color filters is put on the CCD.

A color separation process used in such a case will be described below with reference to FIG. 19.

For field A reading at line 180, a signal from alternate pixel portions Mg, Cy, Mg, Cy and a signal from alternate pixel portions Yel, G, Yel, G are output simultaneously and added. Accordingly, the output at line 180 is given as a cycle of 2R+B+G, B+2G, 2R+B+G, and B=2G and is expressed as an AC component (2R - G) $\sin\omega t$.

Similarly, at line 182, signal outputs from alternate pixel portions Mg, Cy, Mg, Cy and signal outputs from alternate pixel portions G, Yel, G, Yel are added to obtain (2B - G) $\sin\omega t$. From these AC components, color difference components 2R - G, 2B - G are extracted by carrier component demodulation. Signals for line 184 and subsequent lines are processed in the same manner.

With respect to field B, 2R - G and 2B - G are alternately obtained at lines 186 and 188. The combination of pixel rows for each line is shifted one row between the fields to adjust interlace scanning and spatial positions at the time of television image output to reduce the magnitude of flicker in the5 image output. Signals for line 190 and subsequent lines are processed in the same manner.

For charge transfer in complementary color filer CCDs, inter-line reading methods based on two-line simultaneous reading are ordinarily practiced. The concept of them will be described below briefly with reference to FIGS. 20 and 21. FIG. 20 shows the principle of the operation of a typical two-line simultaneous reading, and FIG. 21 shows the principle of the operation of vertical transfer based on typical four-phase driving.

In FIG. 20, blocks 200, 202, 204, 206, and 207 represent photodiodes, and blocks 208, 210, 212, 214, 216, 218, 220, 222, and 224 represent buckets for reading charges on the photodiodes. Charges on the photodiodes 202 and 206 adjacent to buckets 212 and 220 are first read into the buckets 212 and 220 by timing B, and charges on the photodiodes 200 and 204 adjacent to the buckets 208 and 216 are read into the buckets 208 and 216 by timing H and are mixed with the charges in the buckets 212 and 220. Charges on adjacent photodiodes (photodiodes 200 and 202, 204 and 206) are thus added. At the time of reading in the next field, different combinations of photodiodes having charges to be added (photodiodes 202 and 204, 206 and 207) are set. Interlacing is therefore effected at the time of charge reading from the CCD.

As shown in FIG. 21, charges read out by two-line simultaneous reading are transferred from left to right by changing the bias voltages for the buckets are successively changed. This is the principle of the operation of vertical transfer based on typical four-phase driving. Reference symbols in FIG. 21 are the same as those in FIG. 20.

A CCD having such a structure is incapable of one-line sequential reading because charges are mixed owing to its specific structure. Transfer for one-line sequential reading cannot be performed unless at least three registers are provided for one photodiode.

A three-phase driving method using at least three registers for one photodiode for such reading requires at least three registers for each photodiode, for example, as shown in FIG. 22, registers 226, 228, and 230 for photodiode 200, registers 232, 234, and 236 for photodiode 202, registers 238, 240, and 242 for photodiode 204, and registers 244, 246, and 248 for photodiode 207, so that the register capacity per unit, i.e., the maximum transfer charge amount is reduced, resulting in a reduction in the image sensor saturation limit.

For this reason, in the case of an image sensor, such as a two-line simultaneous reading image sensor of the above-mentioned inter-line type and of the non-interlace-adaptation type, having a structure incapable of one-line reading, if it (of course, a black-and-white image sensor having no color filter) is adapted for the R/G/B-surface-sequential method, one (one frame of) color image is formed by exposure for two fields for each color, i.e., for six fields in all.

That is, 2:1 interlace scanning is effected, color video signals are formed with respect to fields of odd scanning and even scanning, odd and even field signals for each color are combined to form one frame image in the corresponding color, and one frame of color image is formed from three frame images in R, G, and B. Among methods of forming a static color image, one shown in FIG. 23 is the simplest. There is another example of the color static image formation method shown in FIG. 4 in which a one frame of color image is formed by a combination such that exposure color is sustained in the opposite fields of one frame.

If these methods are directly applied to processing of an animated image, two fields, i.e., 1/10 second is required to obtain one frame of color image. It is not easy for a viewer in observing a movement of the animated image with a flicker at 10 Hz thereby generated. In the case of the R/G/B-surface-sequential method, along with the flicker or movement in a color frame cycle, a color misalignment phenomenon due to a deviation of the color exposure timings caused when the subject is moved occurs because the exposure timings for the respective colors are sequential (continuous) with respect to time. There is therefore the problem of fatigue of visual sensation during observation.

SUMMARY OF THE INVENTION

An object of the present invention is to provide an electronic endoscope system which images an animated image by an R/G/B-surface-sequential method using a solid image pickup device of an inter-line reading type based on two-line simultaneous reading, and which is capable of reducing the magnitude of flicker in the image.

To this end, according to the present invention, there is provided an electronic endoscope comprising an inter-line reading type solid image pickup device for effecting photoelectric conversion of a subject image and for outputting image information thereby obtained while alternately separating odd field information and even field information, surface-sequential light irradiation means for successively irradiating the subject with irradiation lights in a plurality of different wavelength ranges, read means for reading out information obtained from the solid image pickup device by irradiation with lights in the plurality of wavelength ranges supplied by the surface-sequential light irradiation means, changeover means for changing odd field information and even field information obtained from the information read out by the read means with respect to the plurality of different wavelength ranges, memory means for successively storing the odd field information and the even field information obtained by the changeover means in a plurality of memory areas corresponding to the irradiation lights in the plurality of wavelength ranges, synchronizing read means for reading each of the odd field information and the even field information stored in the plurality of memory areas of the memory means while making the information concurrent with respect to the irradiation lights in the plurality of different wavelength ranges, and period setting means for setting the period for reading of the synchronizing read means.

Other features and advantages of the present invention will become apparatus from the following detailed description of the invention.

BRIEF DESCRIPTION OF THE DRAWINGS

FIGS. 1 to 10 relate to a first embodiment of the present invention;

FIG. 1 is a schematic perspective view of the construction of an electronic endoscope system;

FIG. 2 is a diagram of the construction of an essential section of an electronic endoscope system using a single-plate color chip CCD;

FIG. 3 is a diagram of the construction of an essential section of an electronic endoscope system for R/G/B-surface-sequential signal processing using a single-plate monochromatic CCD;

FIG. 5 is a diagram of the construction of a color filter;

FIG. 6 is a diagram of contents of a display on the monitor of the electronic endoscope system;

FIG. 8 is a diagram showing a state of frame memories for storing video information when a three-element color filter is used;

FIG. 9 is a diagram of a state of frame memories for storing video information when a six-element color filter is used;

FIG. 10 is a diagram of the construction of a six element color filter;

FIGS. 11 to 14 relate to a second embodiment of the present invention;

FIG. 11 is a diagram of the construction of an essential section of an electronic endoscope system for R/G/B-surface-sequential signal processing using a single-plate monochromatic CCD;

FIG. 12 is a diagram of a state of frame memories for storing video information;

FIG. 14 is a diagram of the construction of a nine-element color filter;

FIGS. 15 to 17 relate to a third embodiment of the present invention;

FIG. 15 is a diagram of the construction of an essential section of an electronic endoscope system for R/G/B-surface-sequential signal processing using a single-plate monochromatic CCD;

FIG. 16 is a diagram of contents of a display on the monitor of the electronic endoscope;

FIG. 18 is a diagram of the construction of the electronic endoscope system;

FIG. 19 is a diagram of reading of image information from a CCD with a mosaic filter;

FIGS. 20(A) to (N) are a diagram of timing of the operation of a two-line simultaneous reading method;

FIGS. 21(A) to (J) are a diagram of timing of vertical transfer by four-phase driving;

Figs. 22(A) to (G) are a diagram of timing of one-line successive reading based on a three-phase driving method;

FIG. 23 is a diagram of reproduction of color image information; and

FIG. 24 is a diagram of reproduction of color image information in a modification of the arrangement shown in FIG. 22.

DESCRIPTION OF THE PREFERRED EMBODIMENTS

An electronic endoscope system in accordance with the first embodiment of the present invention will be described below with reference to the accompanying drawings, in which a single-plate monochromatic CCD having a structure equivalent to that of a single-color chip CCD and having no color filter is used to effect R/G/B-surface-sequential processing.

Figure 1:
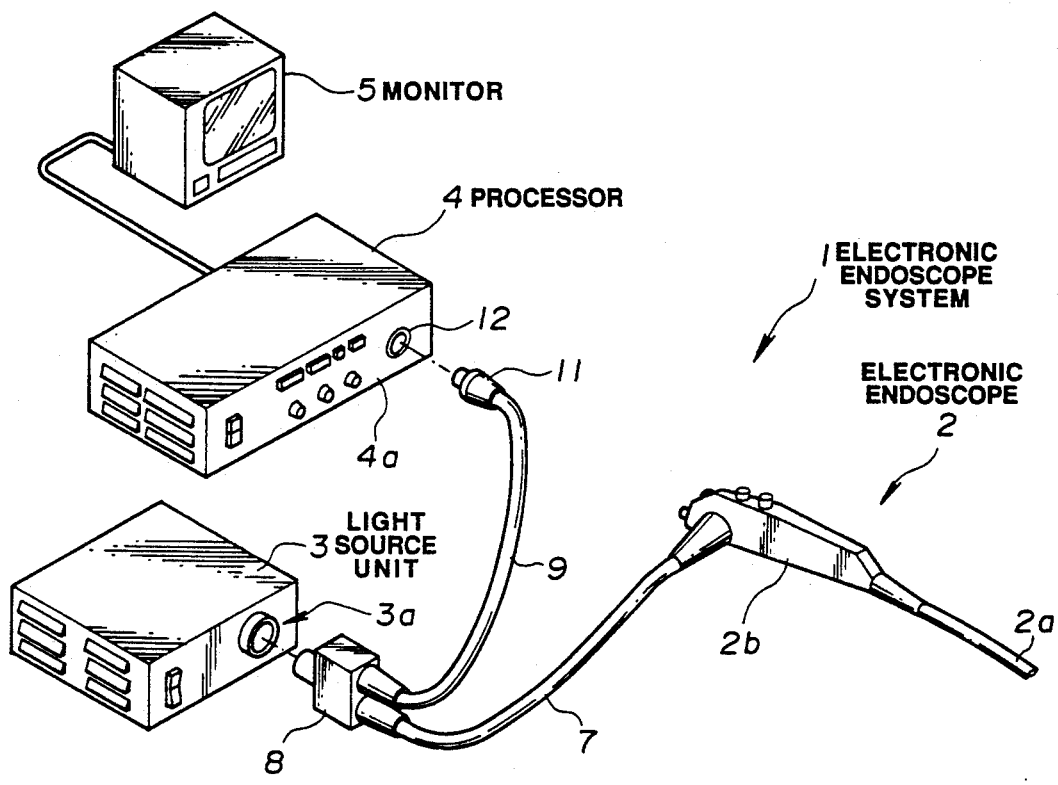

As shown in FIG. 1, an electronic endoscope system 1 in accordance with the first embodiment is constituted of an electronic endoscope 2, a light source unit 3, a controller or a processor 4 and a monitor 5 connected to the processor 4.

The electronic endoscope 2 has an elongated flexible insertion portion 2a and a thick handle portion 2b connected to a rear end of the insertion portion 2a. A first cable 7 having flexibility and incorporating an unillustrated light transmission means or the like extends, for example, laterally from the handle portion 2b. An intermediate connector 8 is provided at the extreme end of the first cable 7, and one end of the light transmission means is connected to an unillustrated illumination connector formed in the intermediate connector 8. The illumination connector in the intermediate connector 8 is constructed to be connected to a connector 3a in the light source unit 3 to enable illumination light to be supplied from an unillustrated light source provided in this light source unit into the electronic endoscope 2 through the first cable 7.

A second cable 9 is provided which extends from the intermediate connector 8. An engagement member, e.g., a plug 11, is formed at the extreme end of the second cable 9 so as to be fitted into a fixing member, e.g., a jack 12, provided in a panel surface 4a of the processor 4.

Figure 2:
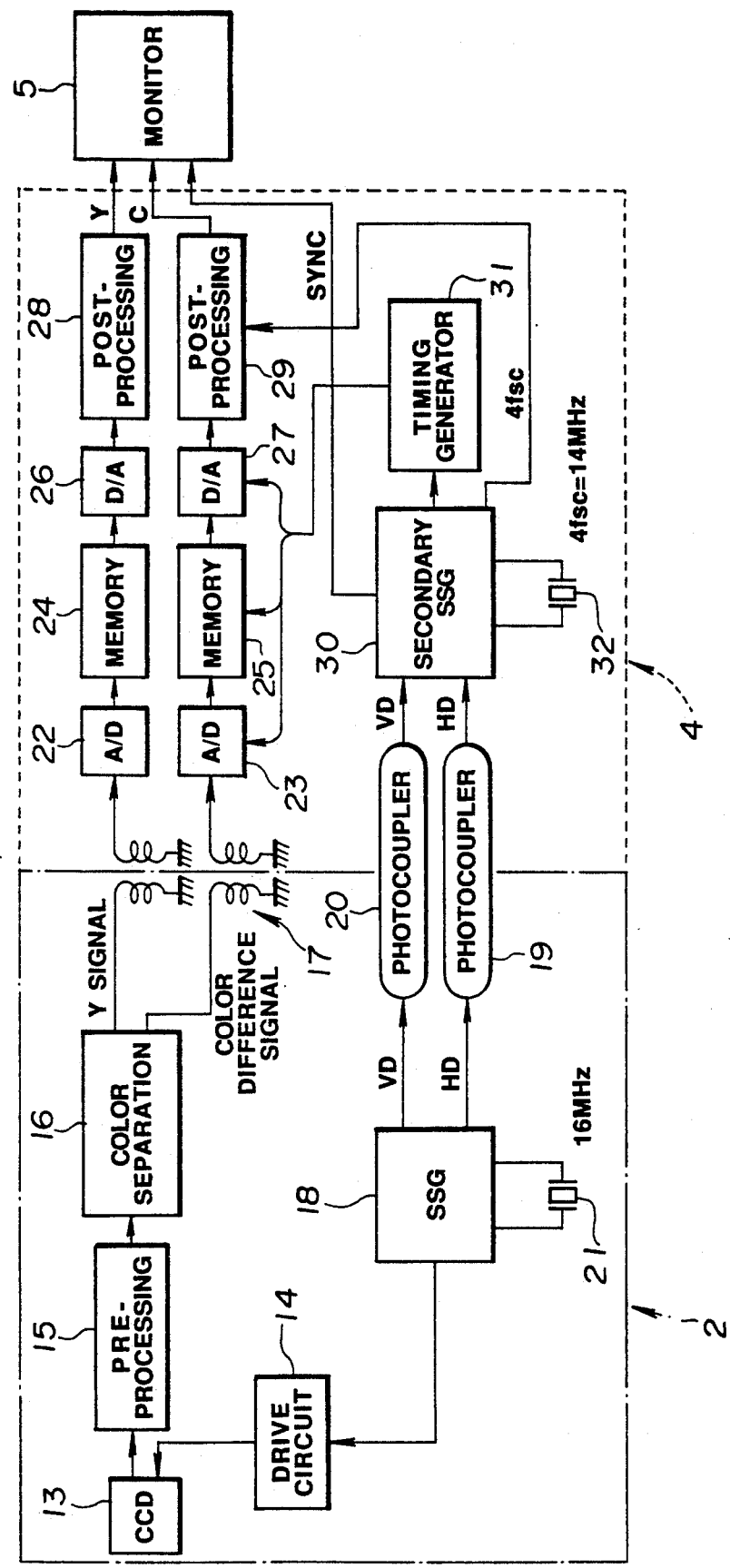

An electronic endoscope system 1 using a single color chip CCD will first be described. As shown in FIG. 2, the electronic endoscope 2 is constituted of, for example, a single-plate color chip CCD 13, a drive circuit 14 for driving the CCD 13, a pre-processing circuit 15 for converting an image pickup signal from the CCD 13 into a video signal, a color separation circuit 16 for forming a Y signal and a color difference signal by color-separating this video signal, and a pulse transformer 17 for transmitting the Y signal and the color difference signal formed by the color separation circuit 16 to the processor 4. The electronic endoscope 2 further has a sync signal generator (SSG) 18 for supplying a drive sync signal to the drive circuit 14. The SSG 18 can transmit horizontal and vertical clocks HD and VD as reference clocks to the processor 4 through photocouplers 19 and 20.

A 16 MHz fundamental clock of an oscillator 21 of the SSG 18 is used as a clock for driving a horizontal shift register for the CCD 13.

The processor 4 is constituted of A/D converter circuits 22 and 23 for respectively converting the Y signal and the color difference signal transmitted from the pulse transformer 17 in an analog form into digital signals, freezing/frame position moving FIFO memories 24 and 25 for storing digital signals converted by the A/D converter circuits 22 and 23, D/A converter circuits 26 and 27 for D/A conversion of the signals supplied through the memories 24 and 25, and post-processing circuits 28 and 29 for forming video signals from the analog signals from the D/A converter circuits 26 and 27.

The processor 4 also has a secondary SSG 30 which receives HD and vD from the photocouplers 19 and 20 and generates video sync signals (SYNC) having the same periods, and a timing generator 31 for generating from the secondary SSG 30 a timing signal for driving of the A/D converters 22 and 23, the memories 24 and 25 and the D/A converters 26 and 27.

The reference clock of the secondary SSG 30 is set to, for example, 14 MHz (=4 fsc) by an oscillator 32. This is because it is selected to be also used as a sub-carrier fsc required for NTSC chroma modulation. Accordingly, the Y signal and the color difference signal transmitted by the pulse transformer 17 in an analog form are converted into digital signals by the 4 fsc clock and, after D/A conversion via the freezing/frame position moving FIFO memories 24 and 25, are processed by the post-process circuits 28 and 29 to output Y and C signals and an NTSC signal.

Next, an electronic endoscope system using a single-plate monochromatic chip will be described.

Figure 3:
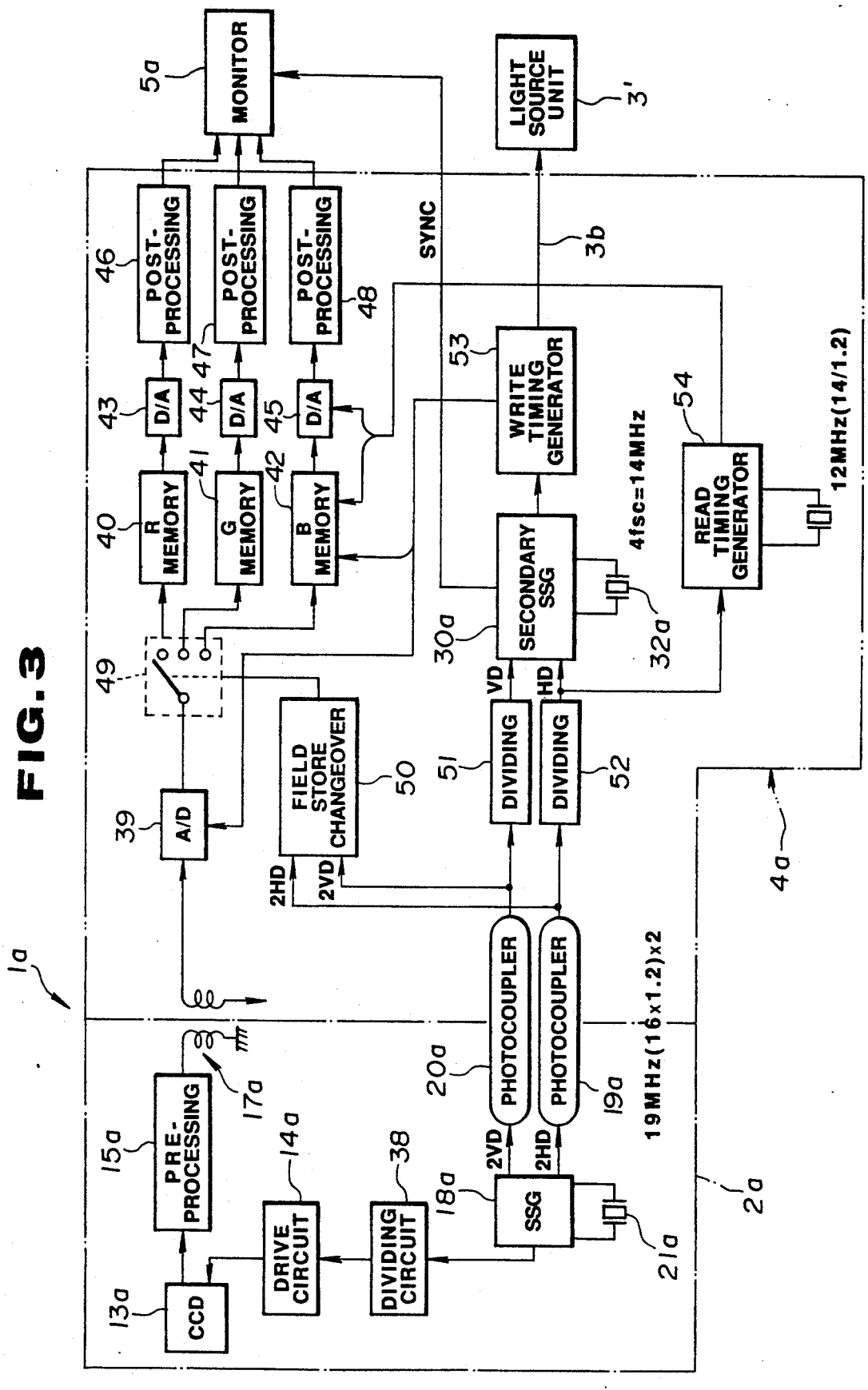

As shown in FIG. 3, an electronic endoscope system 1a using a single-plate monochromatic chip is constituted of an electronic endoscope 2a inserted into a body cavity, a light source unit 3' for supplying, for example, RGB surface-sequential illumination light to the electronic endoscope 2a, a processor 4a for converting an image pickup signal from the electronic endoscope 2a into an image signal, and a monitor 5a for displaying based on the image signal from the processor 4a. The electronic endoscope 2a and the processor 4a are insulated from each other.

The electronic endoscope 2a is constituted of an interline reading type solid image pickup device for imaging a subject image and for obtaining an image signal by photoelectric conversion of the subject image, for example, a single-plate monochromatic chip CCD 13a, a drive circuit 14a for driving the CCD 13a, a pre-process circuit 15a for converting the image pickup signal from the CCD 13a into a video signal, and a pulse transformer 17a for transmitting this video signal to the processor 4a. The electronic endoscope 2a further has a sync signal generator (SSG) 18a for supplying a drive sync signal to the drive circuit 14a through a dividing circuit 38. The SSG 18a can transmit horizontal and vertical clocks as reference clocks to the processor 4a through photocouplers 19a and 20a.

A 19 MHz fundamental clock of an oscillator 21a of the SSG 18a is used as a clock for driving a horizontal shift register for the CCD 13a.

The processor 4a is constituted of an A/D converter circuit 39 for converting the video signal transmitted from the pulse transformer 17a in an analog form into digital signals, freezing/frame position moving FIFO memories, an R memory 40, a G memory 41 and a B memory 42 for storing digital signals converted by the A/D converter circuit 39, D/A converter circuits 43, 44, and 45 for D/A conversion of the signals supplied through the R memory 40, the G memory 41 and the B memory 42, and post-process circuits 46, 47, and 48 for forming video signals from the analog signals from the D/A converter circuits 43, 44, and 45.

The processor 4 also has a field store changeover circuit 50 which generates a signal for changing a switch 49 between the R memory 40, the G memory 41 and the B memory 42 by receiving the horizontal and vertical clocks from the photocouplers 19a and 20a, dividing circuits 51 and 52 for dividing the horizontal and vertical clocks by 2, a secondary SSG 30a for generating a video sync signal (SYNC) having the same period from the clocks divided by 2 by the dividing circuits 51 and 52, and a write timing generator 53 which generates from the secondary SSG 30a a timing signal for write driving of the A/D converter circuit 39, the R memory 40, the G memory 41 and the B memory 42 and a timing signal 3b for irradiation of surface-sequential light from the light source unit 3'.

The reference clock of the secondary SSG 30a is set to, for example, 14 MHz (=4 fsc) by an oscillator 32a.

The processor 4a further has a read timing generator 54 which receives a signal from the dividing circuit 52 for dividing the vertical clock by 2 to generate a timing signal for read driving of the R memory 40, the G memory 41, the B memory 42 and the D/A converter circuits 43, 44, and 45.

Figure 4A:
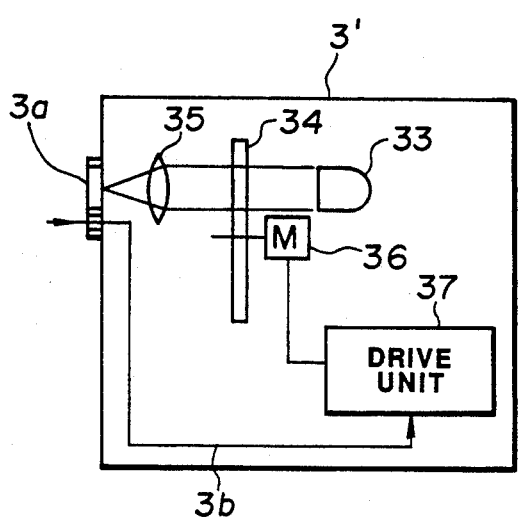
FIGS. 4(a) and 4(b) are diagrams of the constructions of light source units for supplying R/G/B-surface-sequential light.
Figure 5:
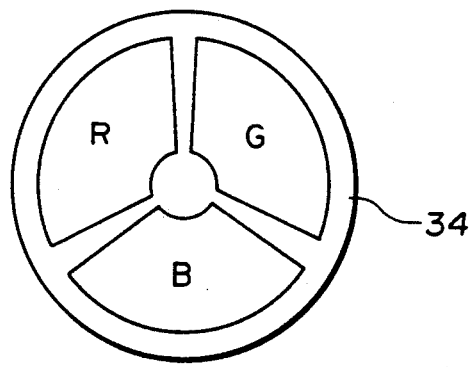

As shown in FIG. 4(a), the light source unit 3' in this case has a light source 33 for supplying white light, a disk-lixe RGB color filter 34, such as that shown in FIG. 5, for dividing white light into lights in a plurality of wavelength ranges, a condenser lens 35 for converging illumination light divided into the plurality of wavelength ranges through the color filter 34 to an end surface of the illumination connector in the intermediate connector 8 connected to the connector 3a, a motor for rotating the color filter 34, and a drive unit 37 for driving and controlling the motor 36 based on the surface-sequential light irradiation timing signal 3b generated by the write timing generator 53.

Figure 4B:
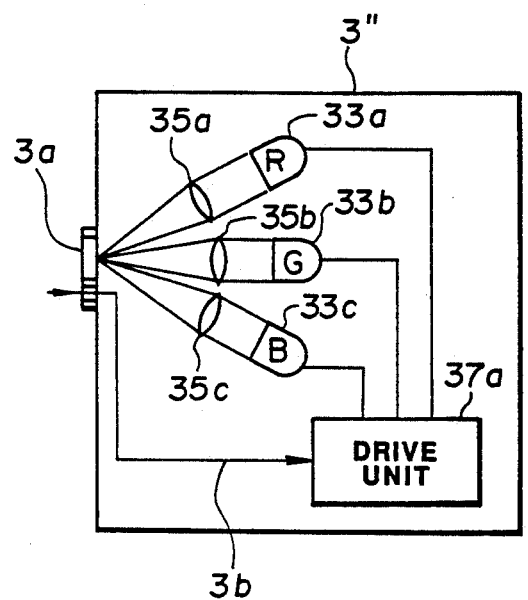

The light source unit is not limited to this. For example, a light source unit 3'' may be used which has, as shown in FIG. 4(b), an R irradiation light source 33a, a G irradiation light source 33b, a B irradiation light source 33, condenser lenses 35a, 35b, and 35c for condensing the illumination lights from these light sources to the end surface of the illumination connector of the intermediate connector 8 connected to the connector 3a, and a drive unit 37a for successively driving and lighting the R irradiation light source 33a, the G irradiation light source 33b, and the B irradiation light source 33 based on the surface-sequential light irradiation timing signal 3b generated by the write timing generator 53.

Figure 6:
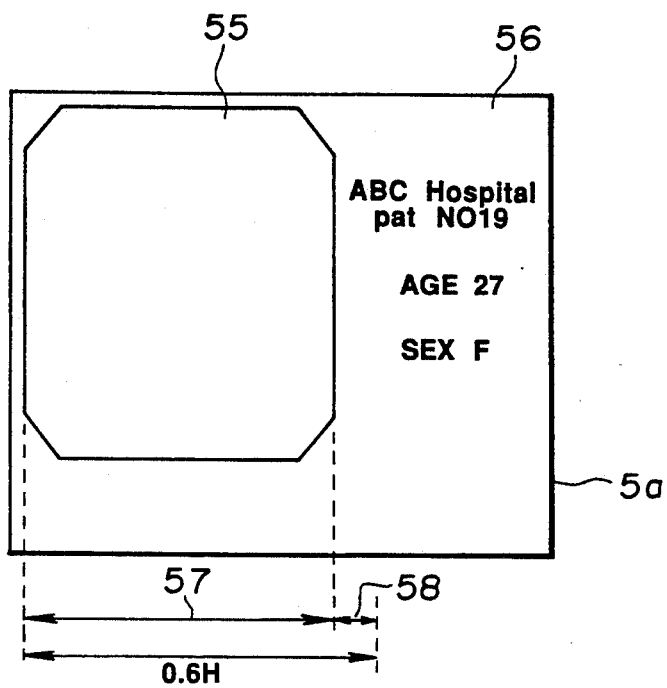

In the electronic endoscope 2a constructed as shown in FIG. 3, a clock having a frequency 1.2 time higher than 16 Hz, a frequency of 19 MHz, is used instead of the 16 MHz clock shown in FIG. 2, for the following reason. As shown in FIG. 6, the output image on the monitor 5a of the electronic endoscope system 1a includes, along with an endoscope image portion 55, an index information display portion 56 on which an index information image is output, and the endoscope image portion 55 is therefore smaller than the area of the full frame. The number of pixels of the CCD 13a is correspondingly reduced in comparison with the ordinary TV camera CCD. That is, a smaller CCD chip is used to reduce the size of the endoscope tip.

Figure 7A:
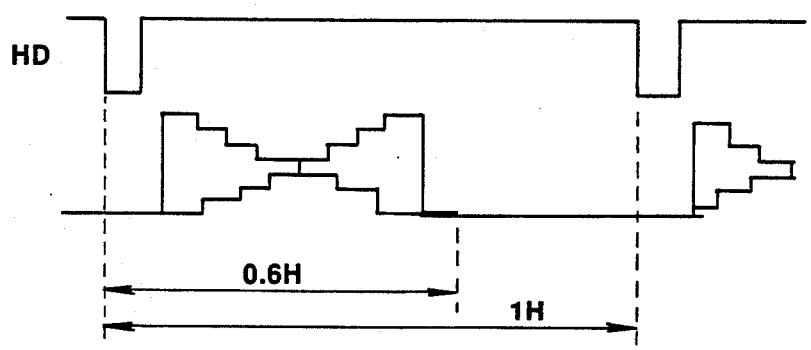
FIGS. 7(A) and 7(B) are timing charts of video signal timings.

Assuming that the sum of the effective image output period 57 and the period 58 of an optical black (OB) portion for providing a black reference voltage for the CCD output is 0.6 H (1 H=63.5 μs=: horizontal scanning period) as shown in FIG. 7(A), if the horizontal shift register for the CCD 13a is driven by a clock having a frequency 1.2 time higher that defined by this period, then 0.6 H/1.2=0.5 H, to that data corresponding to two lines of the CCD register can be read out in the period of 1 H. Each of the 16 MHz and 19 MHz clocks is formed of pulses having a frequency condition such as to be locked with HD pulses by PLL. Consequently, a signal corresponding to each two-field picture of the CCD output can be extracted in one field period (1/60 sec) without doubling the horizontal clock, thus reducing the difficulty in high-frequency driving to an extent not negligible.

In the first embodiment, to reduce the exposure period, i.e., the period for charge transfer to the CCD vertical registor to 1/120 sec which is ½ of the ordinary period, a reference clock having a frequency of 38 MHz twice as high as that of a desired reference clock (19 MHz) for the horizontal clock is given to the light source unit 3. In the light source unit, the drive unit 37 drives and rotates the major 36 so as to rotate the color filter 35 at a double speed. Pulses 2HD and 2VD correspondingly doubled are therefore transmitted by the photocouplers 19a and 20a. A signal output from the CCD 13a is supplied through the pre-process circuit 15a, is transmitted by the pulse transformer 17a in an analog form is converted by the processor 4a into the digital signal. For the same reason is the arrangement of FIG. 2, 4 fsc is used as the clock for the A/D converter 39 and writing in R memory 40, G memory 41 and B memory 42.

Figure 7B:
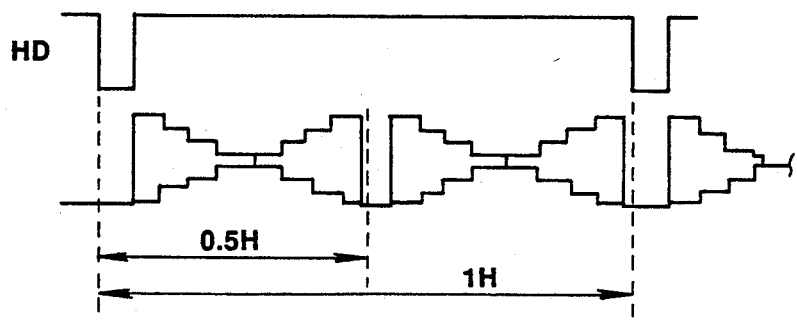

Only one line may suffice for the path from the CCD output ro the A/D converter, because it is used for transmission of a single black-and-white signal. This CCD output ignal has an amplitude corresponding to the condition under the illumination R, G, or B from the subject illumination surface-sequential light source of the light source unit 3a with respect to each field or frame, and and is therefore stored in the R, G or B memory by the changeover circuit 49 according to the illumination light color. At this time, a part of the CCD output signal corresponding to each two-field picture can be stored in one field memory for the reason described above with reference to FIG. 7. Therefore the path for the A/D converted digital signal is changed in front of the memories by the changeover circuit 49 to store the field signal for each color in the corresponding dedicated memory. After D/A conversion, each signal is output through the corresponding post-process circuit 46, 47 or 48. At this time, the clock for reading from the R, G and B FIFO memories 40, 41, and 42 and for the D/A conversion is set to 12 MHz which is 1/1.2 of 14 MHz used at the time of writing, thereby restoring output signals from the state of being compressed 1.2 time in the horizontal direction at the time of CCD driving.

Figure 8:
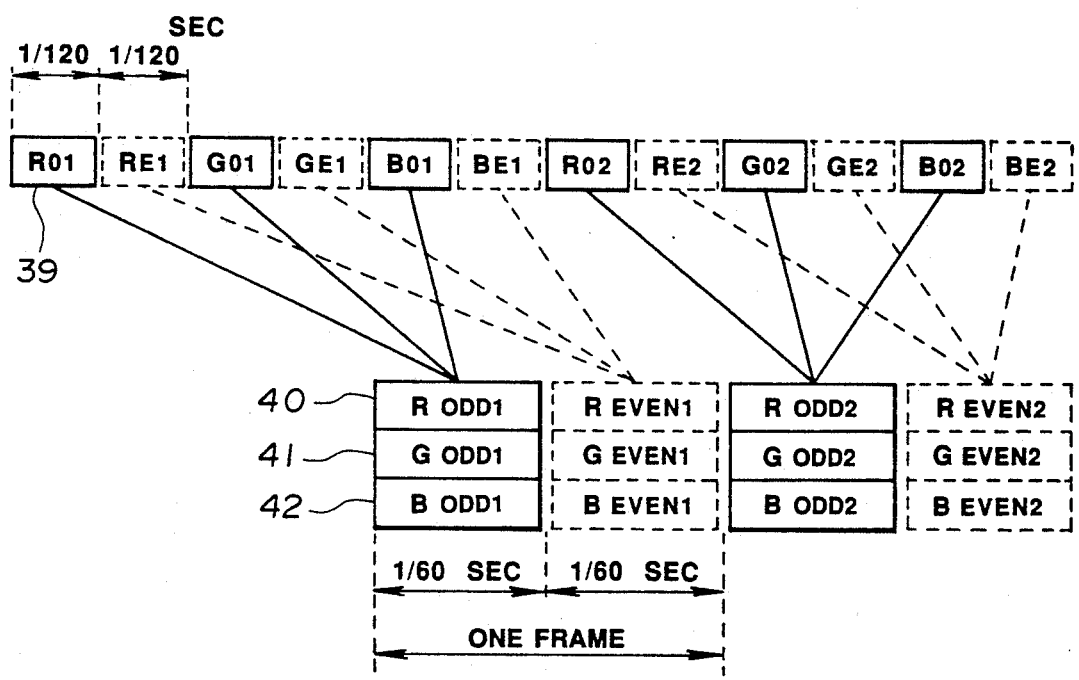

In this system, a subject is irradiated with R/G/B sequential light from the light source unit 3a in synchronization with the CCD exposure period, and a surface-sequential signal for each color is obtained with respect to each field by the A/D converter 39, as shown in FIG. 8. Then, the time base is shifted by the memories as indicated by the lines with arrows to obtain R, G, B field signals/frame signals corresponding to odd and even fields, and the time base is restored in accordance with the prescribed TV signal period by the FIFO memories, R memory 40, G memory 41 and B memory 42.

In the thus-constructed electronic endoscope system 1a in accordance with the first embodiment, one color frame image can be obtained in a one field period of the conventional system, i.e., 1/20 sec, so that the frequency of flickering with a subject movement during animated image observation is increased to 20 Hz, That is, the magnitude of flicker can be reduced in a case where two-line simultaneous reading inter-line image sensor is used to construct an animated image pickup apparatus based on the R/G/B-surface-sequential method.

Figure 9:
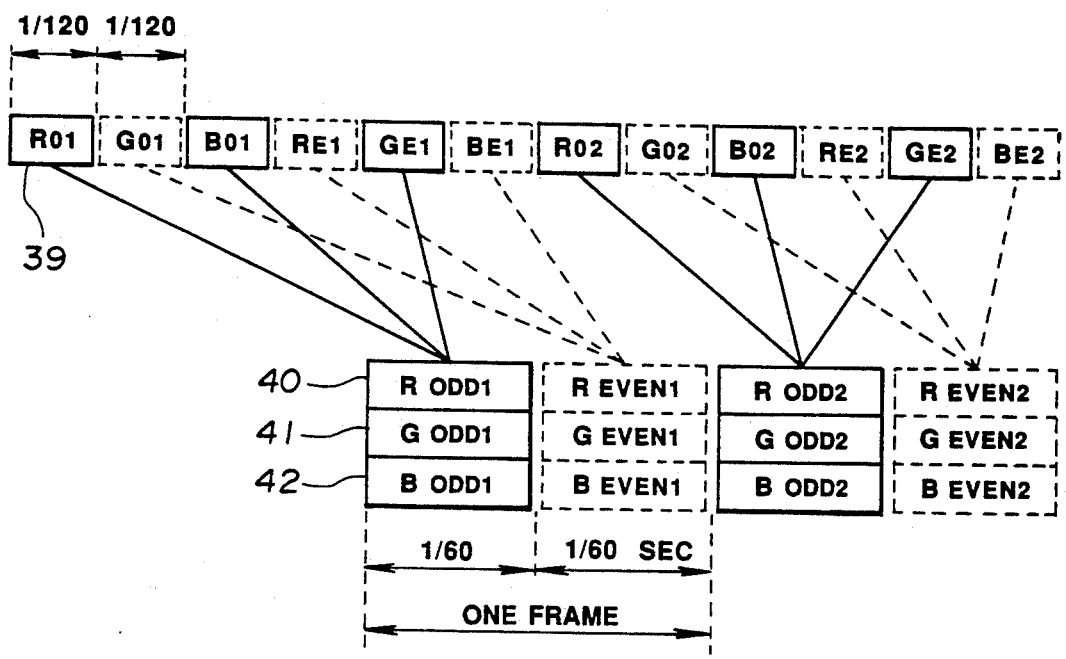
Figure 10:
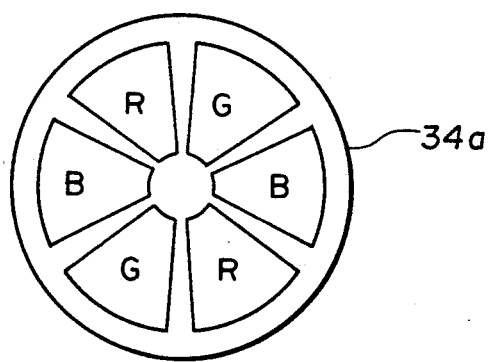

As an example of a modification of this embodiment, there is a system in which the irradiation light is changed with respect to adjacent fields as shown in FIG. 9. The time base may be shifted by the memories in the same manner as the example shown in FIG. 8. In this case, if the color filter in the light source unit 3a is a 6-element color filter 34a shown in FIG. 10, the same rotational frequency as that of the conventional arrangement can be used, so that the light source unit can have a compatibility by interchanging filters. A compatibility of the processor control system can also be achieved since the same memory operation timing is used.

The order in which the colors of each of the color filters 34 and 34a are arranged is not particularly prescribed. Endoscopes in accordance with the present invention can be realized by using a common circuit arrangement with respect to CCD chips based on the same structure, i.e., a single-plate color chip CCD to which a mosaic color filter is attached and a single-plate monochromic CCD to which a no filter is attached, thereby achieving remarkable reductions in design and manufacture costs. This effect is specifically high in a case where image sensors are newly developed for electronic endoscopes or in designing or manufacturing endoscopes and scope lenses for use with such image sensors, since such image sensors are equal in light receiving area and size. Endoscopes in accordance with the present invention can easily be developed by using the single-plate color chip type CCD for low-cost wide use or the single-plate monochromic CCD for high-resolution systems or image processing.

An electronic endoscope in accordance with the second embodiment will be described below.

The construction of an electronic endoscope system in accordance with the second embodiment is generally the same as that of the electronic endoscope in accordance with the first embodiment, and only differences from the first embodiment will be described. The same or corresponding components are indicated by the same reference characters and the description for them will not be repeated.

Figure 11:
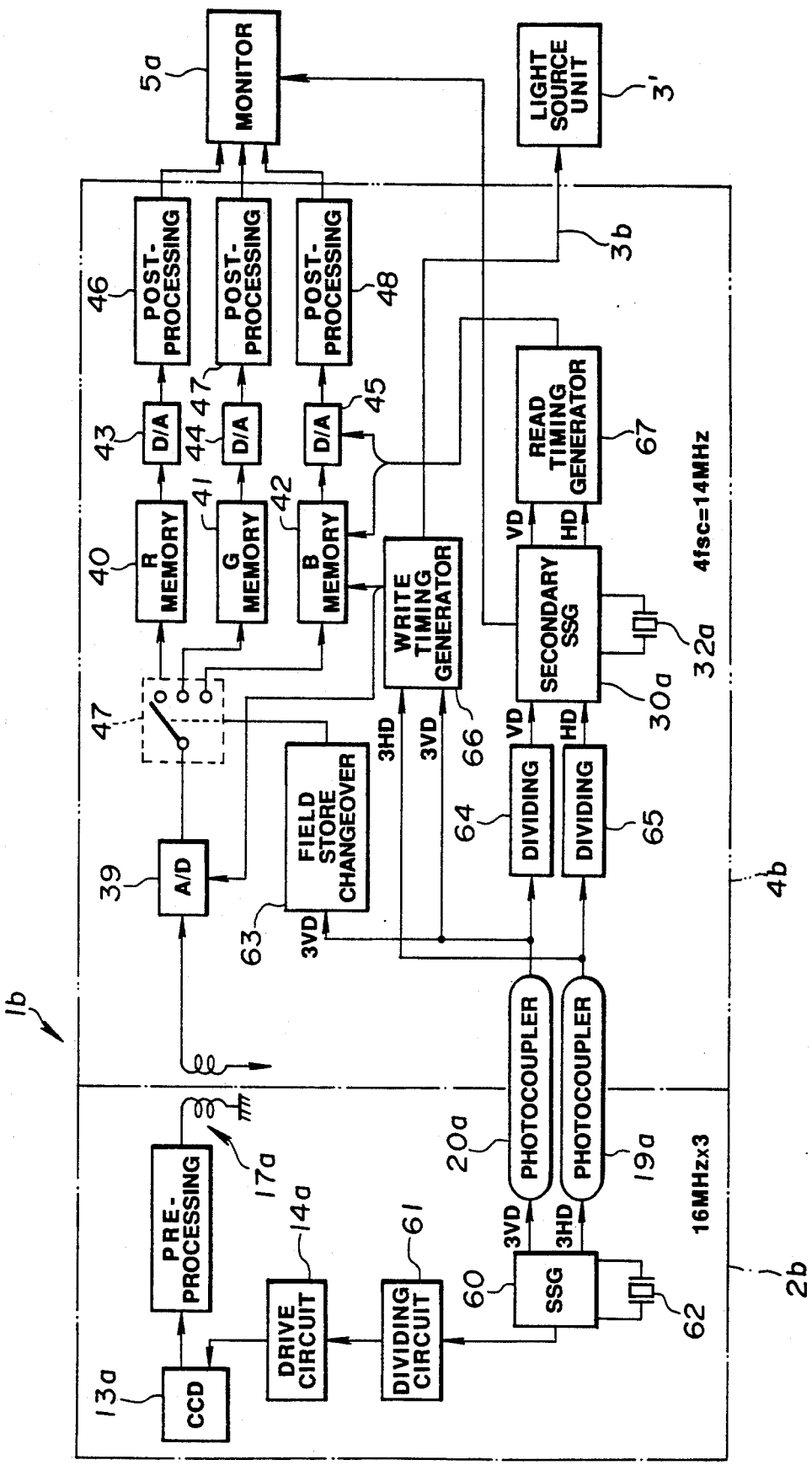

In an electronic endoscope system 1b in accordance with the second embodiment, as shown in FIG. 11, a sync signal generator (SSG) 60 in an electronic endoscope 2b can supply a drive sync signal to a drive circuit 14a through a ⅓ dividing circuit 61 and can supply horizontal clock 3HD and vertical clock 3VD as reference clocks to a processor 4b through photocouplers 19a and 20a.

A 48 MHz fundamental clock of an oscillator 62 of the SSG 60 is used as a clock for driving a horizontal shift registor for a CCD 13a.

The processor 4b has a field store changeover circuit 63 which receives horizontal clocks 3HD and vertical clock 3VD from the photocouplers 19a and 20a to generate a signal for changing switch 49 between R memory 40, G memory 41 and B memory 42, dividing circuits 64 and 65 for dividing the horizontal clock 3HD and vertical clock 3VD by 3, and a write timing generator 66 for forming a timing signal for write driving of A/D converter circuit 39, R memory 40, G memory 41 and B memory 42 based on the horizontal clock 3HD and vertical clock 3VD.

The processor 4b further has a read timing generator 67 which receives through secondary SSG 30a VD and HD signals from the dividing circuits 64 and 65 for dividing horizontal clock 3D and vertical clock 3VD to form a timing signal for read driving of R memory 40, G memory 41, B memory 42 and D/A converter circuits 46, 47, and 48.

In the second embodiment, to reduce the exposure period i.e., the period for charge transfer to the CCD vertical register to 1/180 sec which is ⅓ of the ordinary period a reference clock having a frequency of 48 MHz three times higher than that of a desired reference clock (16 MHz) for generating the horizontal clock is to the light source unit 3a shown in FIG. 4. In the light source unit, the drive unit 37 drives and rotates the motor 36 so as to rotate the color filter 35 at a trebled speed. Pulses 3HD and 3VD correspondingly trebled are therefore transmitted by the photocouplers 19a and 20a.

Except for these points, the construction of this embodiment is the same as that of the first embodiment.

Figure 12:
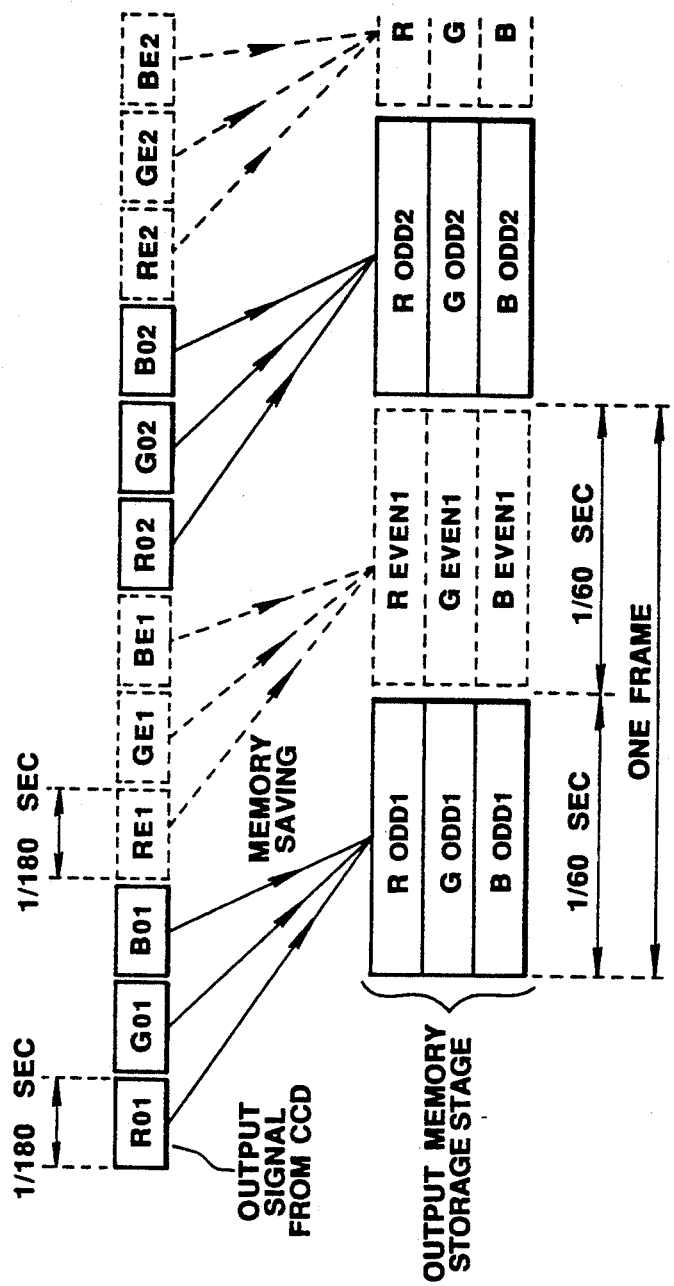
Figure 13A:
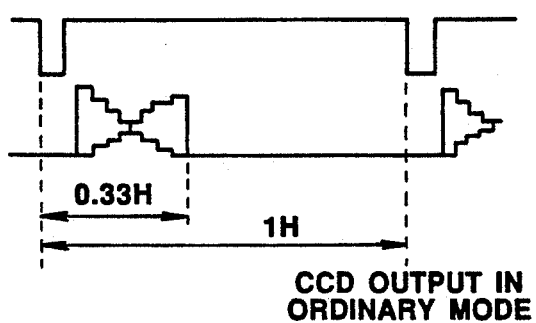
FIG. 13(A) and 13(B) are timing charts of video signal timings.
Figure 13B:
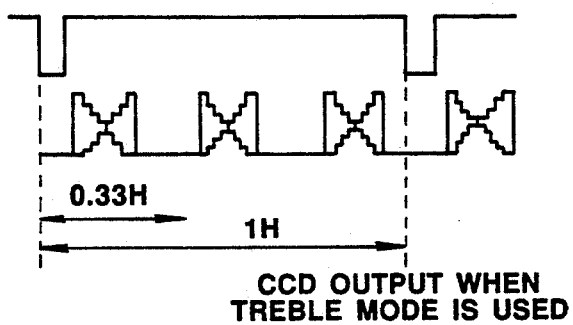

Next, in the electronic endoscope 1b thus constructed in accordance with the second embodiment, a subject is irradiated with R/G/B sequential light from the light source unit 3a in synchronization with the CCD exposure period, and a surface-sequential signal for each color is obtained with respect to each field, as shown in FIG. 12. Then, the time base is shifted by the memories as indicated by the lines with a-rows to obtain R, G, B field signals/frame signals corresponding to odd and even fields, and the time base is restored in accordance with the prescribed TV signal period by the FIFO memories, R memory 40, G memory 41 and B memory 42, as shown in FIG. 13.

In the electronic endoscope system 1b in accordance with the second embodiment, one color frame image can be obtained in a one field period of the corresponding conventional system, i.e., 1/30 sec, so that the frequency of flickering with a subject movement during animated image observation is increased to 30 Hz, That is, the magnitude of flicker can be reduced in the case of imaging of an animated image based on the R/G/B-surface-sequential method using a two line simultaneous reading inter-line reading type solid image pickup device.

Figure 14:
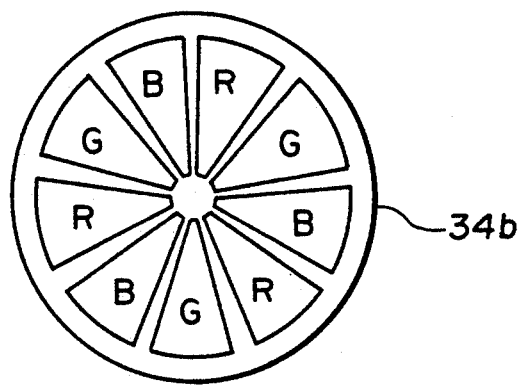

If a 9-element color filter 34b shown in FIG. 14, which is an example of a modification of the color filter, is used, the same rotational frequency as that of the conventional arrangement can be used, so that the light source unit can have a compatibility. A compatibility of the processor control system can also be achieved since the same memory operation timing is used.

The order in which the colors of the color filter 34b are arranged is not particularly prescribed. Endoscopes in accordance with the present invention can be realized by using a common circuit arrangement with respect to CCD chips used of the same structure, i.e., a single-plate color chip CCD to which a mosaic color filter is attached and a single-plate monochromic CCD to which a no filter is attached, thereby achieving remarkable reductions in design and manufacture costs. This effect is specifically high in a case where image sensors are newly developed for electronic endoscopes or in designing or manufacturing endoscopes and scope lenses for use with such image sensors, since such image sensors are equal in light receiving area and size. Edoscopes in accordance with the present invention can easily be developed by using the single-plate color chip tape CCD for low-cost wide use or the single-plate monochromic CCD for high-resolution systems or image processing.

An electronic endoscope in accordance with the third embodiment will be described below.

The construction of the third embodiment is generally the same as that of the second embodiment. Only differences from the second embodiment will be described, and the description for details of the construction will not be repeated. The same or corresponding components as those of the second embodiment are indicated by the same reference characters.

Figure 15:
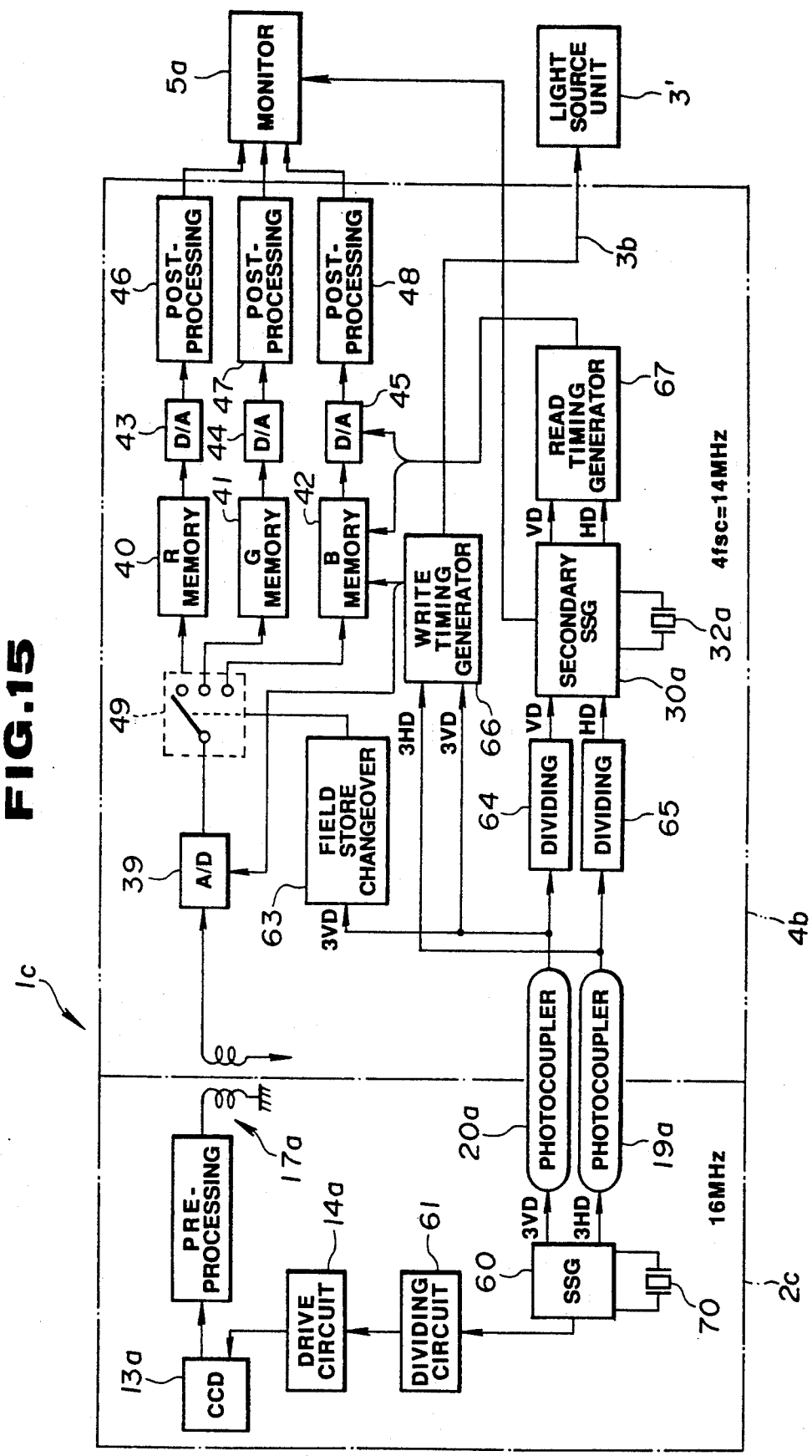

As shown in FIG. 15, the frequency of an oscillator 70 connected to SSG 60 in an electronic endoscope system 1c in accordance with the third embodiment is set to 16 MHz. Except for this, the arrangement is the same as the second embodiment.

Figure 16:
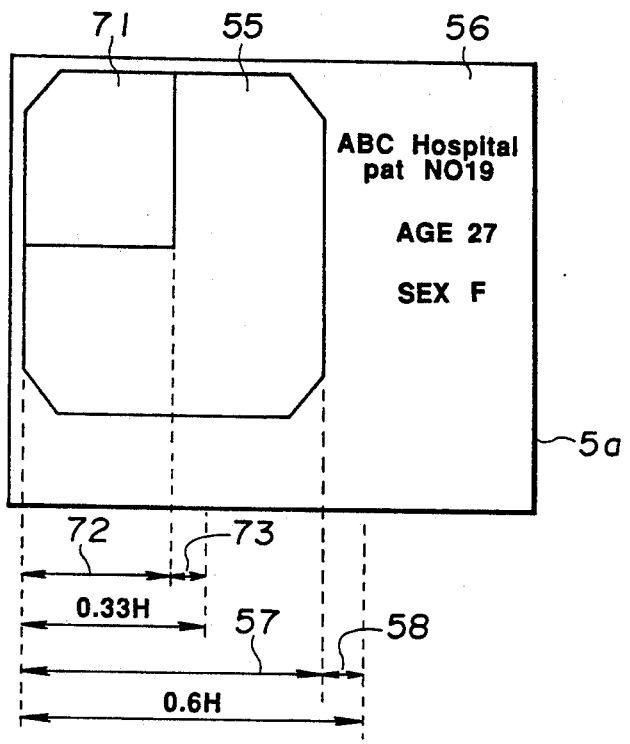

In the electronic endoscope system 1c thus constructed in accordance with the third embodiment, as shown in FIG. 16, the output image on the monitor 5a of the endoscope system includes, along with an endoscope image portion 55, an index information display portion 56 on which an index information image is output, and the endoscope image portion 55 is therefore smaller than the area of the full frame. The number of pixels of the CCD 13a is correspondingly reduced in comparison with the ordinary TV camera CCD. That is, a smaller CCD chip is used to reduce the size of the endoscope tip. Further, if the electronic endoscope is adapted for example, for observation of bronchial tubes, the CCD chip is further reduced in size since the insertion portion is reduced in thickness, so that the image output area of the electronic endoscope for bronchial tubes is formed is an image portion 71 smaller than the endoscope image portion 55 of the monitor 5a mentioned above.

Assuming that the sum of the effective image output period 72 and the period 73 of an optical black (OB) portion for providing a black reference voltage for the CCD output is 0.33 H (1 H=63.5 μs=: horizontal scanning period), data co&responding to three lines of the CCD register can be read out in the period of 1 H.

Figure 17A:
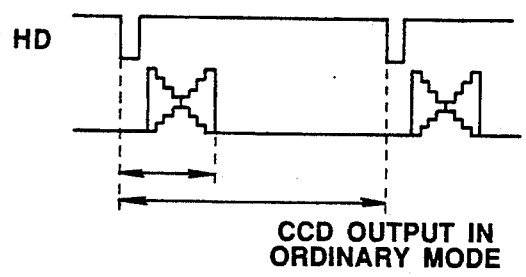
FIGS. 17(A) and 17(B) are timing charts of video signal timings.
Figure 17B:
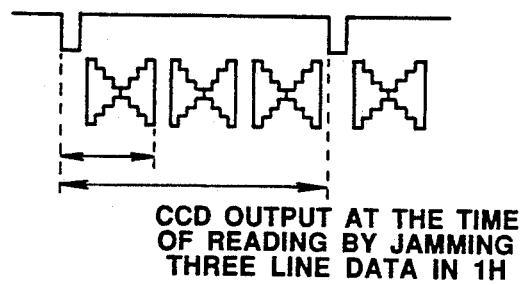
Figures 18, 19:
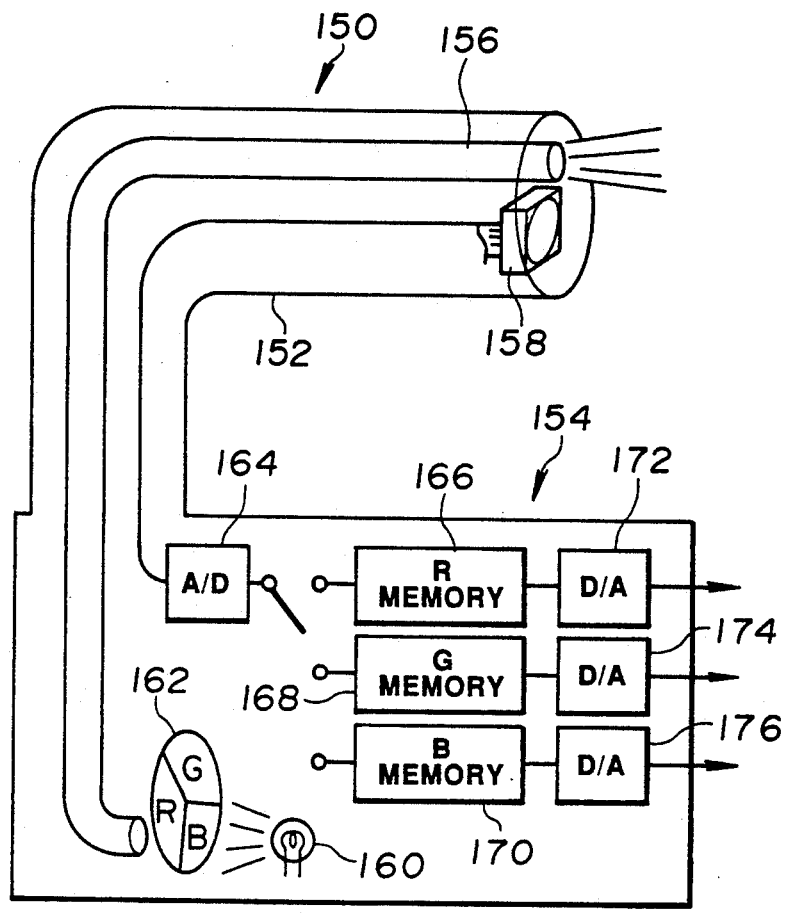
FIGS. 18 to 24 relate to a conventional electronic endoscope system.
Figure 20:
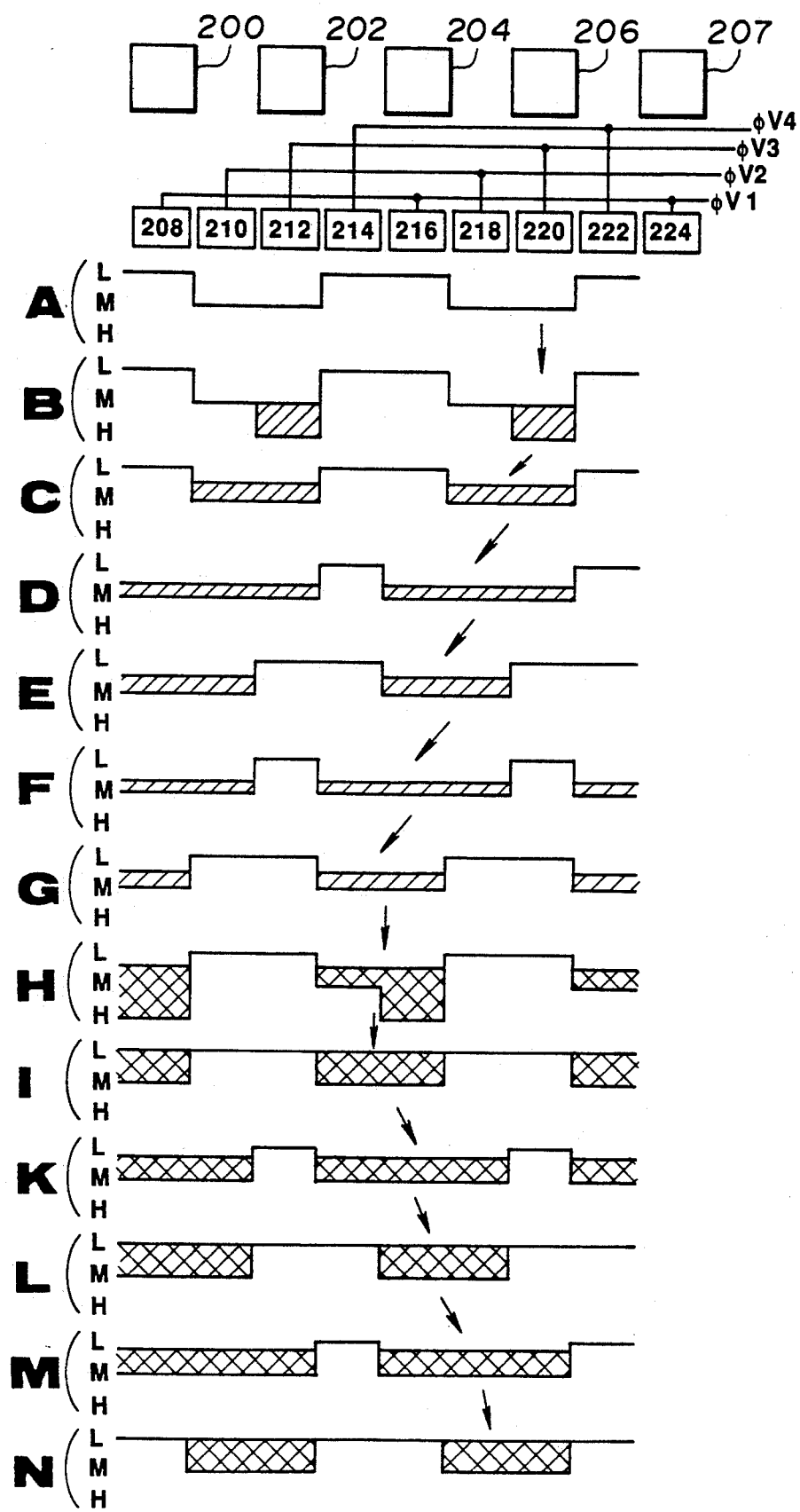
Figure 21:
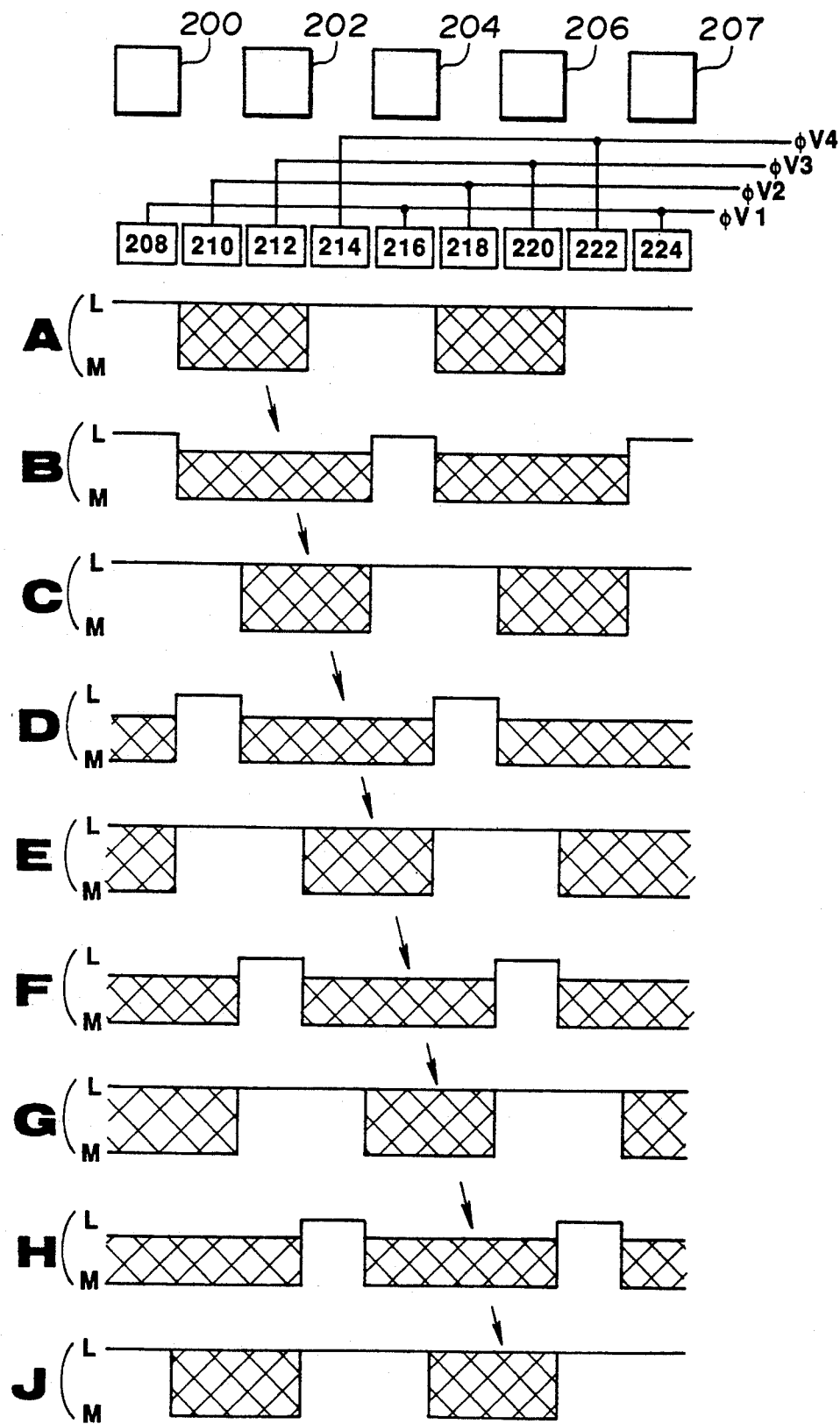
Figure 22:
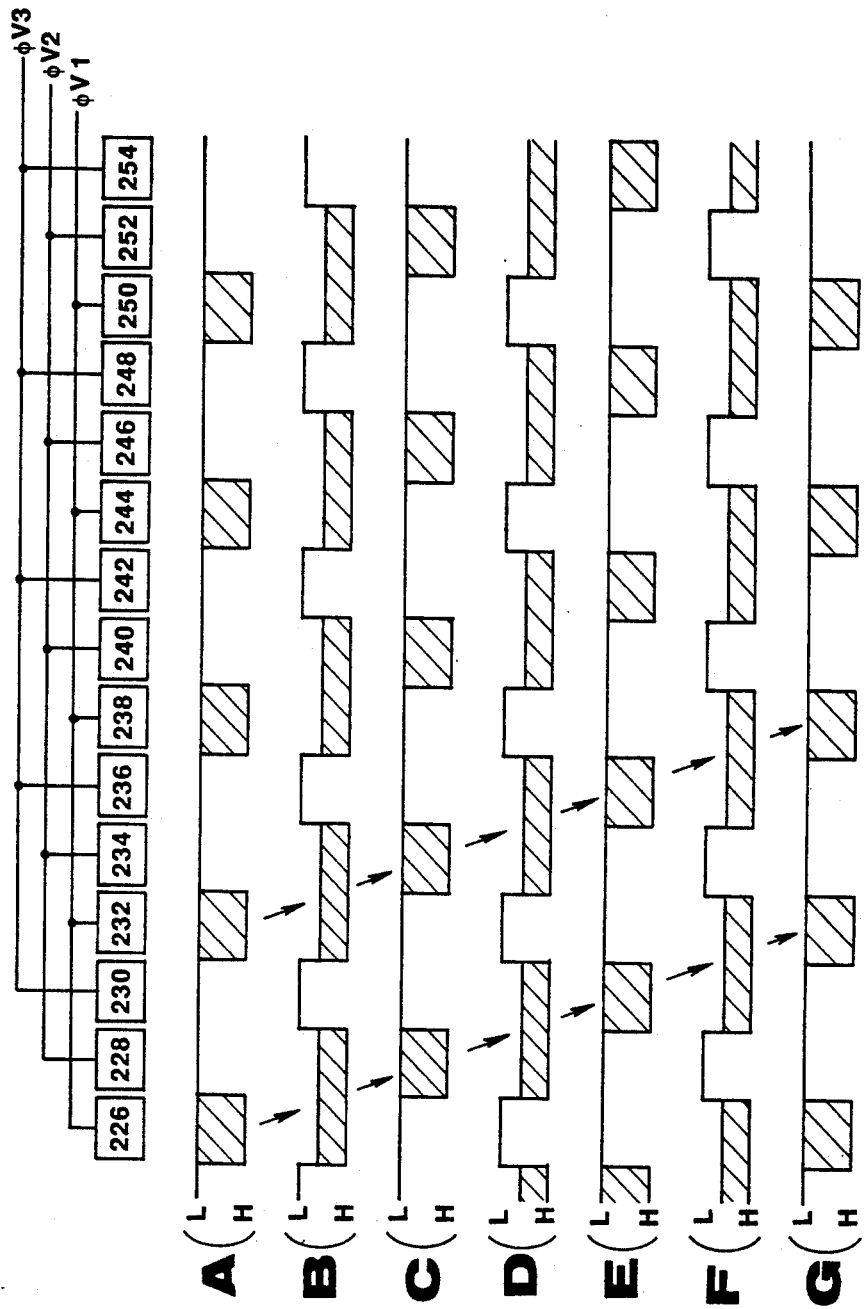
Figure 23:
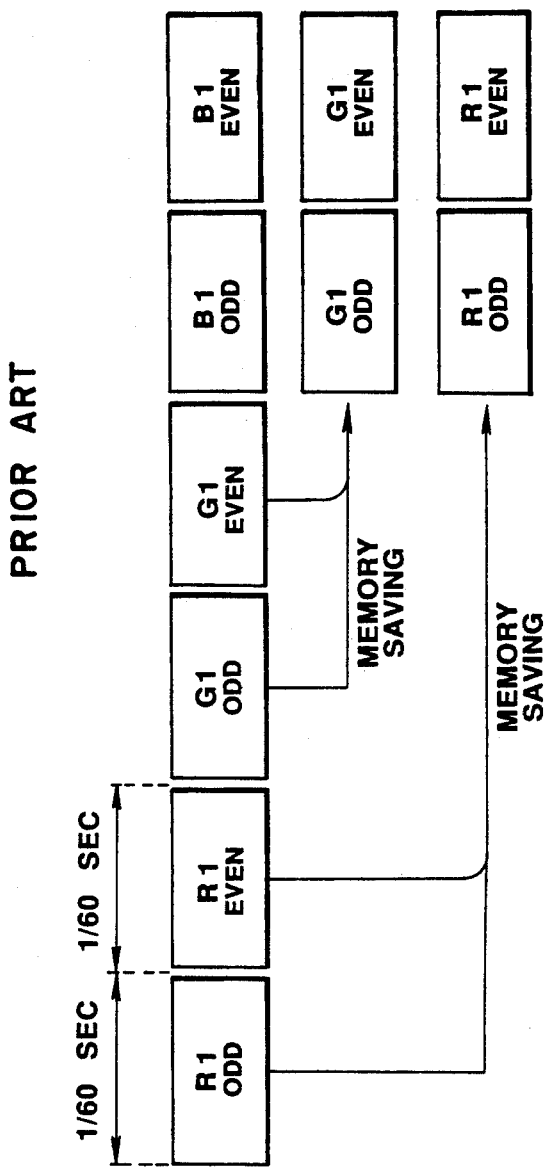
Figure 24:
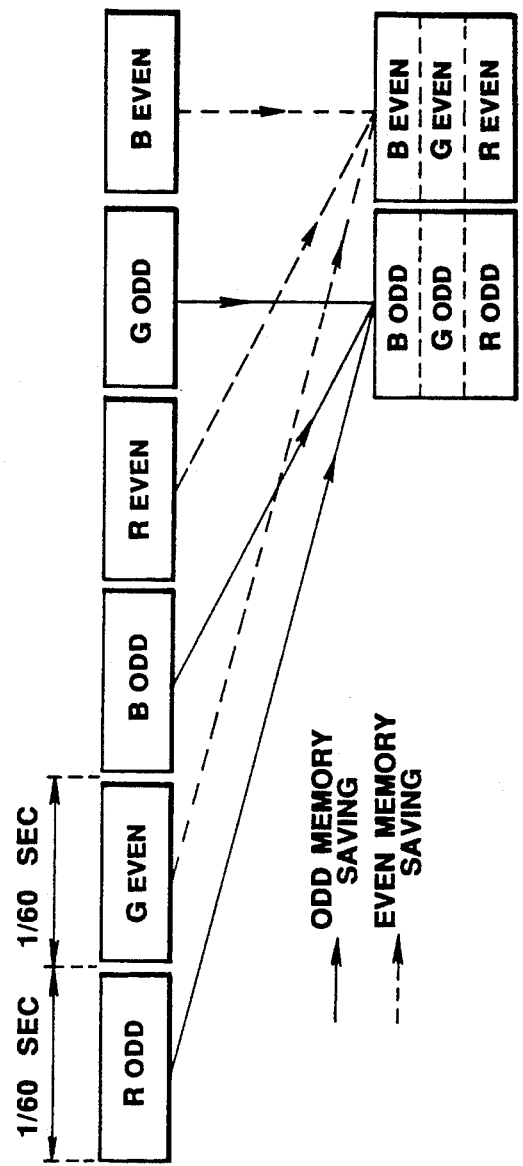

Consequently, a signal corresponding to each three-field picture of the CCD output can be extracted by being packed in one field period (1/60 sec) without trebling the horizontal clock as in the case of first embodiment (see FIGS. 17(A) and 17(B), thus reducing the difficulty in high-frequency driving to an extent not negligible.

Although packing is effected in the horizontal direction alone in the third embodiment, packing can also be etfected in the same manner in the vertical direction. That is, data corresponding to three fields is read out in one vertical period (1/60 sec) as in the case of reading three-line data in the period of 1 H.

Other operations and effects of this embodiment are the same as those of the second embodiment.

It is apparent that other various embodiments of the present invention can be constructed without departing from the spirit and scope of the invention. It is to be understood that the invention is not limited to the specific embodiments thereof except as defined in the appended claims.

What is claimed is:

1. An electronic endoscope, comprising:

an inter-line reading type solid image pickup device for effecting photoelectric conversion of a subject image and for outputting image information thereby obtained while alternately separating odd field information and even field information, said inter-line reading type image pickup device including a single-plate monochromatic CCD, and said image information including monochromatic information;

a drive circuit means for driving said single-plate monochromatic CCD to cause reading out of said image information;

sync signal generating means producing a drive sync signal for driving said drive circuit means, and for producing horizontal a. Vertical output clock signals;

surface-sequential light irradiation means for successively irradiating the subject with irradiation lights in a plurality of different wavelength ranges;

read means for reading out information obtained from said solid image pickup device by irradiation with lights in the plurality of wavelength ranges supplied by said surface sequential light irradiation means;

changeover means for changing odd field information and even field information obtained from the information read out by said read means with respect to the plurality of different wavelength ranges;

memory means for successively storing the odd field information and the even field information obtained by said changeover means in a plurality of memory areas corresponding to the irradiation lights in the plurality of wavelength ranges;

synchronizing read means for reading each of the odd field information and the even field information stored in the plurality of memory areas of said memory means while making the information concurrent with respect to the irradiation lights in the plurality of different wavelength ranges; and period setting means for setting the period for reading of said synchronizing read means;

wherein said sync signal generating means sets a period for causing said drive circuit means for driving said single-plate monochromatic CCD to cause periodic reading out of said image information at a periodic rate which is 1/n (n≧2; n is an integer) of a horizontal scanning period of a monitor, so that each n-field picture of the CCD output can be extracted in one field period without changing the horizontal clock signal.

2. An electronic endoscope according to claim 1, wherein said synchronizing read means includes conversion means for converting each of the odd field information and the even field information made concurrent with respect to the irradiation lights in the plurality of different wavelength ranges into an image signal.

3. An electronic endoscope according to claim 1, wherein said read means includes read signal generation means for forming a read timing signal.

4. An electronic endoscope according to claim 3, wherein said memory means includes area setting means for setting the plurality of memory areas based on the read timing signal generated by said read signal generation means.

5. An electronic endoscope according to claim 3, wherein said changeover means includes timing signal generation means for generating a changeover timing signal based on the read timing signal generated by said read signal generation means.

6. An electronic endoscope according to claim 5, wherein said timing signal generation means controls the surface-sequential light irradiation means based on the changeover timing signal.

7. An electronic endoscope according to claim 5, wherein the period for reading of said synchronizing read means set by said period setting means is an integer-multiple of the period of the changeover timing signal.

8. An electronic endoscope according to claim 5, wherein said surface-sequential light irradiation means includes drive means for emitting visible, read, green and blue illumination lights, and said timing signal generation means controls said drive means based on the changeover timing signal.

9. An electronic endoscope according to claim 8, wherein said drive means comprises a drive means for driving and rotating a disk-like color filter having transmissivity for a plurality of colors: red, green and blue, said color filter separating white light emitted from a light source into read, green and blue lights.

10. An electronic endoscope system according to claim 8, wherein said drive means comprises a drive means for successively driving and lighting a plurality of light sources respectively having red, blue and blue light emitting characteristics.

11. An electronic endoscope system, comprising: an electronic endoscope portion including
an inter-line reading type solid image pickup device for effecting photoelectric conversion of a subject image and for outputting image information thereby obtained while alternately separating odd field information and even field information, said inter-line reading type image pickup device including a single-plate monochromatic CCD, and said image information including monochromatic information;
a drive circuit means for driving said single-plate monochromatic CCD to cause reading out of said image information;

a first sync signal generating means producing a drive sync signal for driving said drive circuit means, and for producing horizontal and vertical output clock signals;
a surface-sequential light irradiation means for successively irradiating the subject with irradiation lights in a plurality of different wavelength ranges; and
a processing means including
read means for reading out information obtained from said image pickup device by irradiation with lights in the plurality of wavelength ranges supplied by said surface sequential light irradiation means;
changeover means for changing odd field information and even field information obtained from the information read out by said read means with respect to he plurality of different wavelength ranges;
memory means for successively storing the odd field information and the even field information obtained by said changeover means in a plurality of memory areas corresponding to the irradiation lights in the plurality of wavelength ranges;
synchronizing read means for reading each of the odd field information and the even field information stored in the plurality of memory areas of said memory means while making the information concurrent with respect to the irradiation lights in the plurality of different wavelength ranges;
timing generator circuit means receiving an output of said second sync signal generating means, for driving said synchronizing read means; and
a second sync signal generating means receiving horizontal and vertical clock signals from said first sync signal generating means, for producing an output SYNC signal for controlling a monitor and for controlling said timing generator circuit means;
wherein said first sync signal generating means sets a period for causing said drive circuit means for driving said single-plate monochromatic CCD to cause periodic reading out of said image information at a periodic rate which is one-half of a horizontal scanning period of a monitor, so that each two-field picture of the CCD output can be extracted in one field period without doubling the horizontal clock signal.

12. An electronic endoscope, comprising:
an inter-line reading type solid image pickup device for effecting photoelectric conversion of a subject image and for outputting image information thereby obtained while alternately separating odd field information and even field information, said inter-line reading type image pickup device including a single-plate monochromatic CCD, and said image information including monochromatic information;
a drive circuit means for driving said single-plate monochromatic CCD to cause reading out of said image information;
sync signal generating means producing a drive sync signal for driving said drive circuit means, and for producing horizontal and vertical output clock signals;
surface-sequential light irradiation means for successively irradiating the subject with irradiation lights in a plurality of different wavelength ranges;

read means for reading out information obtained from said solid image pickup device by irradiation with lights in the plurality of wavelength ranges supplied by said surface sequential light irradiation means;

changeover means for changing odd field information and even field information obtained from the information read out by said read means with respect to the plurality of different wavelength ranges;

memory means for successively storing the odd field information and the even field information obtained by said changeover means in a plurality of memory areas corresponding to the irradiation lights in the plurality of wavelength ranges;

synchronizing read means for reading each of the odd field information and the even field information stored in the plurality of memory areas of said memory means while making the information concurrent with respect to the irradiation lights in the plurality of different wavelength ranges; and period setting means for setting the period for reading of said synchronizing read means;

wherein said sync signal generating means sets a period for causing said drive circuit means for driving said single-plate monochromatic CCD to cause periodic reading out of said image information at a periodic rate which is $1/n$ ($n=2$; n is an interger) of a horizontal scanning period of a monitor, so that each n-field picture of the CCD output can be extracted in one field period without changing the horizontal clock signal.

13. An electronic endoscope according to claim 12, wherein said synchronizing read means includes conversion means for converting each of the odd field information and the even field information made concurrent with respect to the irradiation lights in the plurality of different wavelength ranges into an image signal.

14. An electronic endoscope according to claim 12, wherein said read means includes read signal generation means for forming a read timing signal.

15. An electronic endoscope according to claim 14, wherein said memory means includes area setting means for setting the plurality of memory areas based on the read timing signal generated by said read signal generation means.

16. An electronic endoscope according to claim 14, wherein said changeover means includes timing signal generation means for generating a changeover timing signal based on the read timing signal generated by said read signal generation means.

17. An electronic endoscope according to claim 16, wherein said timing signal generation means controls the surface sequential light irradiation means based on the changeover timing signal.

18. An electronic endoscope according to claim 16, wherein the period for reading of said synchronizing read means set by said period setting means is an integer-multiple of the period of the changeover timing signal.

19. An electronic endoscope according to claim 16, wherein said surface-sequential light irradiation means includes drive means for emitting visible, read, green and blue illumination lights, and said timing signal generation means controls said drive means based on the changeover timing signal.

20. An electronic endoscope according to claim 19, wherein said drive means comprises a drive means for driving and rotating a disk-like color-filter having transmissivity for a plurality of colors: red, green and blue, said color filter separating white light emitted from a light source into read, green and blue lights.

21. An electronic endoscope system according to claim 19, wherein said drive means comprises a drive means for successively driving and lighting a plurality of light sources respectively having red, blue and blue light emitting characteristics.

* * * * *